United States Patent
Song et al.

(10) Patent No.: US 9,477,724 B2
(45) Date of Patent: Oct. 25, 2016

(54) FRAMEWORK FOR VISUALIZING RE-WRITTEN QUERIES TO DATABASE

(71) Applicants: Sang Il Song, Seoul (KR); Won Seok Kim, Seoul (KR); Sanghyun Choi, Seongnam (KR); Yongsik Yoon, Walldorf (DE)

(72) Inventors: Sang Il Song, Seoul (KR); Won Seok Kim, Seoul (KR); Sanghyun Choi, Seongnam (KR); Yongsik Yoon, Walldorf (DE)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 14/311,670

(22) Filed: Jun. 23, 2014

(65) Prior Publication Data
US 2015/0370865 A1    Dec. 24, 2015

(51) Int. Cl.
*G06F 17/30* (2006.01)
(52) U.S. Cl.
CPC ..... *G06F 17/30554* (2013.01); *G06F 17/3046* (2013.01); *G06F 17/30398* (2013.01); *G06F 17/30448* (2013.01); *G06F 17/30463* (2013.01); *G06F 17/30507* (2013.01)
(58) Field of Classification Search
CPC .......... G06F 17/30424; G06F 17/30433; G06F 17/30442; G06F 17/30448; G06F 17/30463; G06F 17/30466; G06F 17/30554; G06F 17/30398; G06F 17/3046; G06F 17/30507
USPC .......... 707/713–721, 758, 765, 769
See application file for complete search history.

(56) References Cited

U.S. PATENT DOCUMENTS

| | | | |
|---|---|---|---|
| 5,544,355 A | 8/1996 | Chaudhur et al. | |
| 6,438,741 B1 | 8/2002 | Al-omari et al. | |
| 2002/0133509 A1* | 9/2002 | Johnston | G06F 17/243 |
| 2011/0208703 A1 | 8/2011 | Fisher et al. | |
| 2013/0151505 A1* | 6/2013 | Yoon | G06F 17/30442 707/718 |
| 2015/0281452 A1 | 10/2015 | Bohlin et al. | |

OTHER PUBLICATIONS

Ambite et al., "Planning by Rewriting", published in 2001.pp. 207-261. Download: https://www.jair.org/media/754/live-754-1916-jair.pdf.*

* cited by examiner

*Primary Examiner* — Hares Jami
(74) *Attorney, Agent, or Firm* — Fountainhead Law Group P.C.

(57) ABSTRACT

Embodiments relate to re-writing database query plans, and visualizing such re-written query plans. A query re-write framework includes a query normalization engine in communication with a rule catalog comprising query re-write rules in the form of rule classes. The framework receives as input, a query plan graph to be re-written. Based upon the engine's application of re-write rules from the catalog, the framework produces a re-written query plan graph as output. An interface component of the framework may provide a visualization of the re-written query plan graph as part of a dashboard. A user may access the framework to enable/disable existing rules in the catalog, add new rules to the catalog, and/or control a sequence and a precedence in which rules are applied to re-write the query plan. A user may interact with the visualization of the re-written query plan for purposes of de-bugging, re-write optimization, and/or query development.

16 Claims, 21 Drawing Sheets

| Rule Name | Search Strategy | To-be-applied rel-types (bit-vector) | | Dependent Rules (rules to be applied before/after applying the rule) | | |
|---|---|---|---|---|---|---|
| | | Pattern | Preconditions | | | |
| View Unfolding | Bottom-up | VIEW | Remove unreferenced view column | | | N |
| Remove Apply | Bottom-up | APPLY | | | | Y |
| Simplify Outer Join | Top-down | JOIN | | Simplify Predicates, Normalize Join Predicates | | N |
| Pull-up Filter | Bottom-up | SELECT | | Simplify Predicates | | N |
| Push-down Filter | Bottom-up | SELECT | | Simplify Predicates | | N |

| RULE_NAME | VARCHAR(64) NOT NULL | Rule name |
| DESCRIPTION | VARCHAR(5000) NOT NULL | Rule description |
| TRAVERSAL_STRATEGY | VARCHAR(8) NOT NULL | Tree traversal strategy: 'TOP_DOWN'/'BOTTOM_UP'/'ROOT_ONLY'/'ANY' |
| PATTERN | VARCHAR(5000) NOT NULL | Applicable operator type(s) |
| PRE_RULES | VARCHAR(5000) NOT NULL | Dependent rules which should be applied before the rule |
| POST_RULES | VARCHAR(5000) NOT NULL | Dependent rules which should be applied after the rule |
| INDISPENSABLE | VARCHAR(5) NOT NULL | Indispensability: TRUE/FALSE |

FIG. 4A

| RULE_APPLICATION_SEQUENCE | BIGINT NOT NULL | Rule application sequence |
| RULE_NAME | VARCHAR(64) NOT NULL | Rule name |
| DESCRIPTION | VARCHAR(5000) NOT NULL | Rule description |
| TRAVERSAL_STRATEGY | VARCHAR(8) NOT NULL | Tree traversal strategy: 'TOP_DOWN'/'BOTTOM_UP'/'ROOT_ONLY'/'ANY' |
| PATTERN | VARCHAR(5000) NOT NULL | Applicable operator type(s) |
| PRE_RULES | VARCHAR(5000) NOT NULL | Dependent rules which should be applied before the rule |
| POST_RULES | VARCHAR(5000) NOT NULL | Dependent rules which should be applied after the rule |
| INDISPENSABLE | VARCHAR(5) NOT NULL | Indispensability: TRUE/FALSE |

FIG. 4B

| RULE_APPLICATION_SEQUENCE | RULE_NAME | DESCRIPTION | TRAVERSAL_STRATE | PATTERN | PRE_RULES | POST_RULES | INDISPENSABLE |
|---|---|---|---|---|---|---|---|
| 1 | View Normalization | Normalize view | ROOT_ONLY | | | | FALSE |
| 2 | View Unfolding | Unfold view | BOTTOM_UP | View | Duplicate view column removal | | FALSE |
| 4 | Grouping Set Conversion | Convert Grouping set into Unions | ROOT_ONLY | | | | FALSE |
| 5 | Grouping ID Substitution | Substitute Grouping ID | BOTTOM_UP | Union All | | | FALSE |
| 6 | Predicate Normalization | Normalize predicate | ANY | | | | FALSE |
| 7 | All Any Unique Removal | Remove All, Any and Unique | ROOT_ONLY | | | | FALSE |
| 8 | Apply Creation | Create Apply | ROOT_ONLY | | | | TRUE |
| 9 | Join Predicate Normalization | Normalize join Predicate | ANY | Join | Join Simplification | | FALSE |
| 10 | Unnecessary Grouping Removal | Remove Unnecessary Grouping | TOP_DOWN | Group By | | | FALSE |
| 11 | Apply Removal | Remove Apply | ROOT_ONLY | | | | TRUE |
| 12 | Unreferenced View Removal | Remove Unreferenced view | ROOT_ONLY | | | | FALSE |
| 15 | Project Removal | Pull up Project | BOTTOM_UP | Project | | | TRUE |
| 16 | Null Simplification | Remove Unnecessary Null Matching Flags | BOTTOM_UP | Table,Filter,join | | | FALSE |
| 17 | Single Aggregation Removal | Remove Unnecessary Single Aggregation | BOTTOM_UP | Group By | | | FALSE |

FIG. 5A

| RULE_APPLICATION_SEQUENCE | RULE_NAME | DESCRIPTION | TRAVERSAL_STRATE_ | PATTERN | PRE_RULES | POST_RULES | INDISPENSABLE |
|---|---|---|---|---|---|---|---|
| 18 | Join Predicate Factoring | Simplify Join Predicate | ANY | Join | Join Simplification | Join Predicate Normalization | FALSE |
| 19 | Nary Union All Creation | Create N-ary Union All | BOTTOM_UP | Union All | | | FALSE |
| 20 | Aggregation Simplification | Simplify Aggregation | BOTTOM_UP | Group By | | | FALSE |
| 22 | Implicit Type Casting | Implicit Type Casting | BOTTOM_UP | | | | FALSE |
| 23 | Select Pull-up | Pull up Select | ROOT_ONLY | | | | FALSE |
| 24 | Unreferenced View Removal | Remove Unreferenced View | ROOT_ONLY | | | | FALSE |
| 26 | Select Push-down | Push down Select | BOTTOM_UP | Filter | | | FALSE |
| 27 | Unreferenced View Removal | Remove Unreferenced View | ROOT_ONLY | | | | FALSE |
| 28 | Select Push-down | Push down Select | BOTTOM_UP | Filter | | | FALSE |
| 29 | Unreferenced View Removal | Remove Unreferenced View | ROOT_ONLY | | | | FALSE |
| 30 | Common Select thru View | Common Select thru View | ROOT_ONLY | | | | FALSE |
| 32 | Full-text Function Push-down | Push down Full-text search function | ROOT_ONLY | | | | FALSE |
| 33 | Unique Index Match Push-down | Push down Unique index match | BOTTOM_UP | Table | | | FALSE |

FIG. 5B

| RULE_APPLICATION_SEQUENCE | RULE_NAME | DESCRIPTION | TRAVERSAL_STRATE | PATTERN | PRE_RULES | POST_RULES | INDISPENSABLE |
|---|---|---|---|---|---|---|---|
| 34 | Distinct Push-down | Push down Distinct | BOTTOM_UP | Group By | | | FALSE |
| 35 | Unnecessary Union Column Removal | Remove Unnecessary Aggregation Column | TOP_DOWN | Group By | | | FALSE |
| 36 | Unnecessary Union Column Removal | Remove Unnecessary Union Column | TOP_DOWN | Union All | | | FALSE |
| 37 | Unnecessary Join Removal | Remove Unnecessary Join | ROOT_ONLY | | | | FALSE |
| 39 | Join Rewriting | Rewrite Join | ROOT_ONLY | | | | FALSE |
| 40 | GroupBy Simplification | Simplify Groupby | ROOT_ONLY | | | | FALSE |
| 41 | OrderBy Removal | Remove Unnecessary OrderBy | BOTTOM_UP | Order By | | | FALSE |
| 42 | Sort Column Removal | Remove Unnecessary Sorting Column | TOP_DOWN | Order By | | | FALSE |
| 43 | Expression Replacement with Generated Columns | Replace Expressions with Generated Columns | ROOT_ONLY | | | | FALSE |
| 44 | Constant View Unfolding | Constant View Unfolding | BOTTOM_UP | View | | | FALSE |
| 45 | Aggregation Push-down to OLAP | Aggregation Push-down to OLAP | BOTTOM_UP | Table | | | FALSE |

FIG. 5C

| RULE_APPLICATION_SEQUENCE | RULE_NAME | DESCRIPTION | TRAVERSAL_STRATE | PATTERN | PRE_RULES | POST_RULES | INDISPENSABLE |
|---|---|---|---|---|---|---|---|
| 47 | Multi-Container Access into Union | Multi-Container Access into Union All | BOTTOM_UP | Table | | | FALSE |
| 48 | Union Local Monitor | Union Local Monitor | BOTTOM_UP | Table | | | FALSE |
| 49 | Host/Port Join Thru Union | Host/Port Join Thru Union | BOTTOM_UP | Join | | | FALSE |

FIG. 5D

| opid | Patent opid | Contents |
|---|---|---|
| 0 | | PROJECT ((1,0), (0, 1000000), (2,4) |
| 1 | 0 | GROUP BY (0) COLUMNS: (1,0), (2,4)<br>AGGR: SUM((1,2)*('1'-TO_DECIMAL(2,3))) |
| 2 | 1 | SELECT FILTER: (1,0) = (2,1) AND<br>(1,6)='BUILDING' AND (2,10) > '1995-03-15' |
| 3 | 2 | INNER JOIN |
| 4 | 3 | TABLE R_CUSTOMER(krdt5081152835303) (0) |
| 5 | 3 | TABLE R_ORDERS(krdt5081152835303) (1) |

Deleted

FIG. 7B

| Plan pID | Contents | |
|---|---|---|
| 0 | PROJECT COL: ((1,0), (0.10000000), (2,4)) | |
| 1 | GROUP BY (0) COLUMNS: (1,0), (2,4) AGGR SUM((1,2)*('1'-TO_DECIMAL(2,3))) | Link-Updated<br>Contents-Updated |
| 3 | INNER JOIN (1,0) = (2,1) | |
| 4 | TABLE R_CUSTOMER(krdt50811528:35303) (1)<br>FILTER: (1,6)='BUILDING' | Contents Updated |
| 5 | TABLE R_ORDERS(krdt50811528:35303) (2)<br>FILTER: (2,10) > '1995-03-15' | Contents Updated |

FIG. 7D

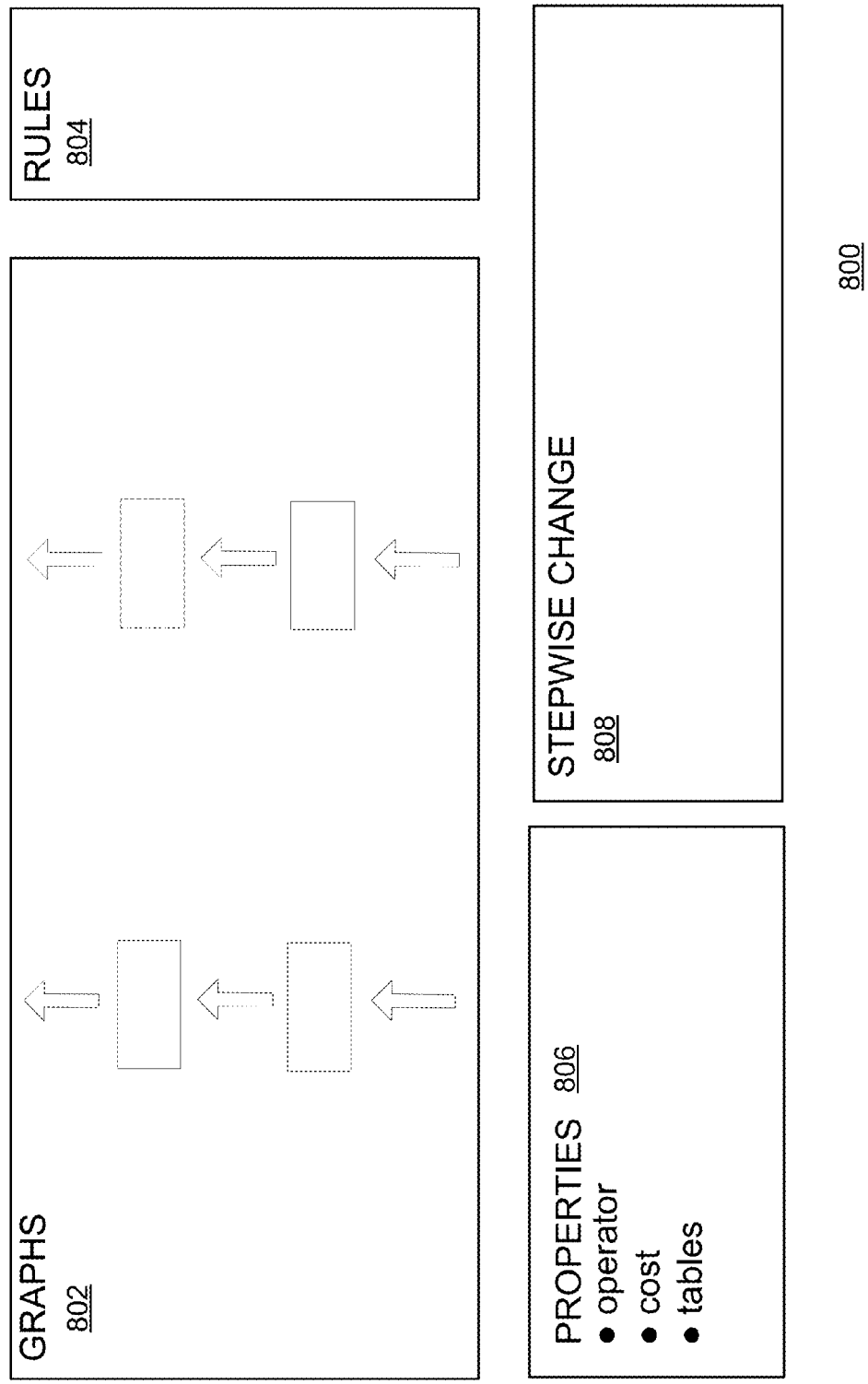

FRAMEWORK FOR VISUALIZING RE-WRITTEN QUERIES TO DATABASE

BACKGROUND

Embodiments relate to accessing data from a database, and in particular, to a framework for re-writing database queries. Unless otherwise indicated herein, the approaches described in this section are not prior art to the claims in this application and are not admitted to be prior art by inclusion in this section.

Databases have evolved to afford both increased capacity and complexity of the data that may be stored. In order to accommodate these features, customers can run complex queries on database tables from the application layer, without having to change the underlying data model.

Instead, databases such as in memory database architectures may rely upon complex models that join, project, and aggregate the existing tables using relational operators in order to provide insights to the user. The resulting database queries that are executed utilizing the models may implicate up to hundreds of database tables, and produce results comprising many individual records.

Typically however, an ordinary user is not an expert in either modeling or database structure/operation. Instead, the user formulates a query in a declarative way using structured query language (SQL). This SQL statement is then written to an execution plan that is understandable by the database.

Under certain circumstances, it may be desirable to re-write such a formal query prior to actual execution on the database. In a highly simplified example, a formal query may implicate data stored at tables A, B, and C of a database. Merging those tables in one sequence {A+B}+C to obtain a query result, however, may be significantly less efficient from a processing standpoint than merging the tables in a different sequence (such as A+{B+C}).

SUMMARY

Embodiments relate to re-writing of database queries, and visualizing such re-written queries. A query re-write framework includes a query normalization engine in communication with a rule catalog comprising a plurality of query re-write rules in the form of rule classes. The framework receives as input, a query plan graph that is to be re-written. Based upon the engine's application of re-write rules from the catalog, the framework produces a re-written query plan graph as output. An interface component of the framework may provide a visualization of the re-written query plan graph as part of a dashboard. A user may access the framework to enable or disable existing rules in the catalog, add new rules to the catalog, and/or control a sequence and a precedence in which rules are applied to re-write the query. A user may interact with the visualization of the re-written query for purposes of de-bugging, re-write optimization, and/or query development.

An embodiment of a computer-implemented method comprises providing an engine in communication with a re-written query plan and with an interface, the re-written query plan resulting from application of a query plan re-write rule to a previous query plan. The engine is caused to reference the re-written query plan in order to generate a visualization. The engine is caused to communicate the visualization to the interface for display in a dashboard.

A non-transitory computer readable storage medium embodies a computer program for performing a method comprising providing an engine in communication with a re-written query plan and with an interface, the re-written query plan resulting from application of a query plan re-write rule to a previous query plan. The method further comprises causing an engine to reference the re-written query plan in order to generate a visualization comprising a graph including an operation node and a table node. The method further comprises causing the engine to communicate the visualization to the interface for display in a dashboard.

An embodiment of a computer system comprises one or more processors and a software program executable on said computer system. The software program is configured to provide an engine in communication with a re-written query plan and with an interface, the re-written query plan resulting from application of a query plan re-write rule to a previous query plan. The software program is configured to cause an engine to reference the re-written query plan in order to generate a visualization comprising a graph including an operation node and a table node. The software program is further configured to cause the engine to communicate the visualization to the interface for display in a dashboard further comprising the previous query plan.

In certain embodiments the visualization comprises a graph including an operation node and a table node.

According to some embodiments the visualization includes a color indicating a change of the re-written query plan from the previous query plan.

In particular embodiments the dashboard further includes the previous query plan.

In various embodiments the dashboard further includes a change log.

According to some embodiments the dashboard further includes a part of the query plan re-write rule.

Particular embodiments further comprise causing the engine to change the query plan re-write rule based upon input received from the interface.

In various embodiments the dashboard further includes cost information.

The following detailed description and accompanying drawings provide a better understanding of the nature and advantages of embodiments.

BRIEF DESCRIPTION OF THE DRAWINGS

FIG. 3A is a simplified view of an embodiment of a rule catalog according to an example.

FIGS. 4A and 4B show monitoring views for query re-write according to an example.

FIGS. 5A-D offer a detailed view of a rule catalog according to an example.

FIGS. 7A-D offer more detailed views of the visualization of a re-written query according to the example.

FIG. 8 is a simplified view of a dashboard for visualizing re-written query plans according to an embodiment.

DETAILED DESCRIPTION

Described herein are techniques for performing query re-writing and visualization according to an embodiment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to re-writing of database query plans, and visualizing such re-written ones. A query plan re-write framework includes a query normalization engine in communication with a rule catalog comprising a plurality of query re-write rules in the form of rule classes. The framework receives as input, a query plan graph that is to be re-written. Based upon the engine's application of re-write rules from the catalog, the framework produces a re-written query plan graph as output. An interface component of the framework may provide a visualization of the re-written query plan graph as part of a dashboard. A user may access the framework to enable or disable existing rules in the catalog, add new rules to the catalog, and/or control a sequence and a precedence in which rules are applied to re-write the query plan. A user may interact with the visualization of the re-written query plan for purposes of de-bugging, re-write optimization, and/or query development.

Figure 1:
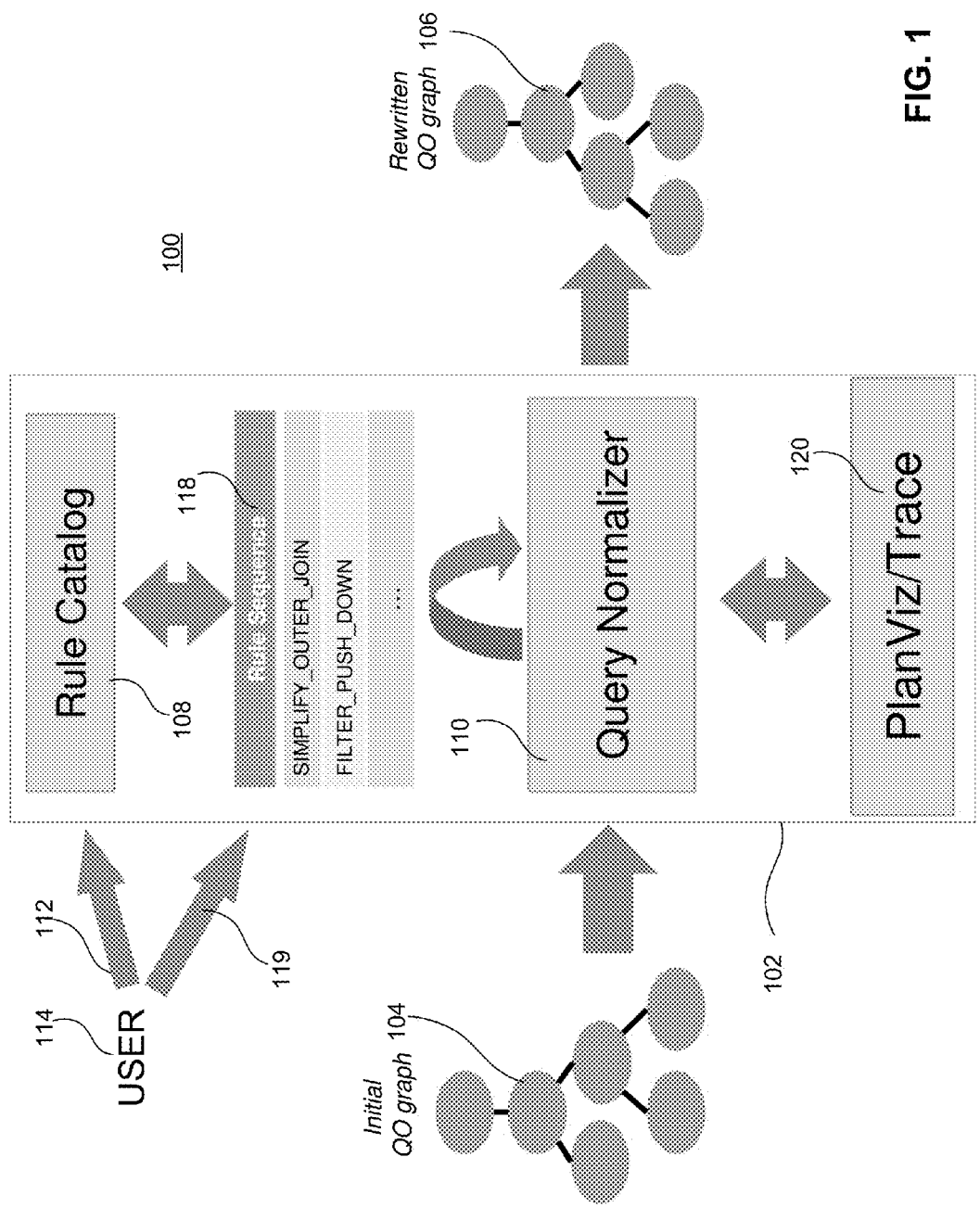
FIG. 1 illustrates a simplified view of a system configured to perform query re-writing and visualization according to an embodiment.

FIG. 1 illustrates a simplified view of a system configured to perform query plan re-writing and visualization according to an embodiment. In particular, system 100 comprises a rule re-writing framework 102 that is configured to receive as an input, an initial Query Optimization (QO) graph 104. This initial QO graph results from parsing a query originally formulated by a non-expert user.

As an output, the framework 102 produces a re-written QO graph 106. As discussed in detail below, the re-written graph is the result of the application of various query re-write rules in a particular sequence.

In particular, the framework comprises a rule catalog 108 that is referenced by a query normalizer engine 110 in order to produce the re-written query. The rule catalog 108 is configured to store query re-write rules as rule classes. This promotes flexibility and conserves effort by allowing re-use of particular rules without having to repeat them.

The rule catalog also provides a centralized destination to receive input 112 from a user 114 regarding the re-write rules. By serving as a repository for rules, the rule catalog may streamline global actions such as enabling or disabling particular rules.

Figure 1A:
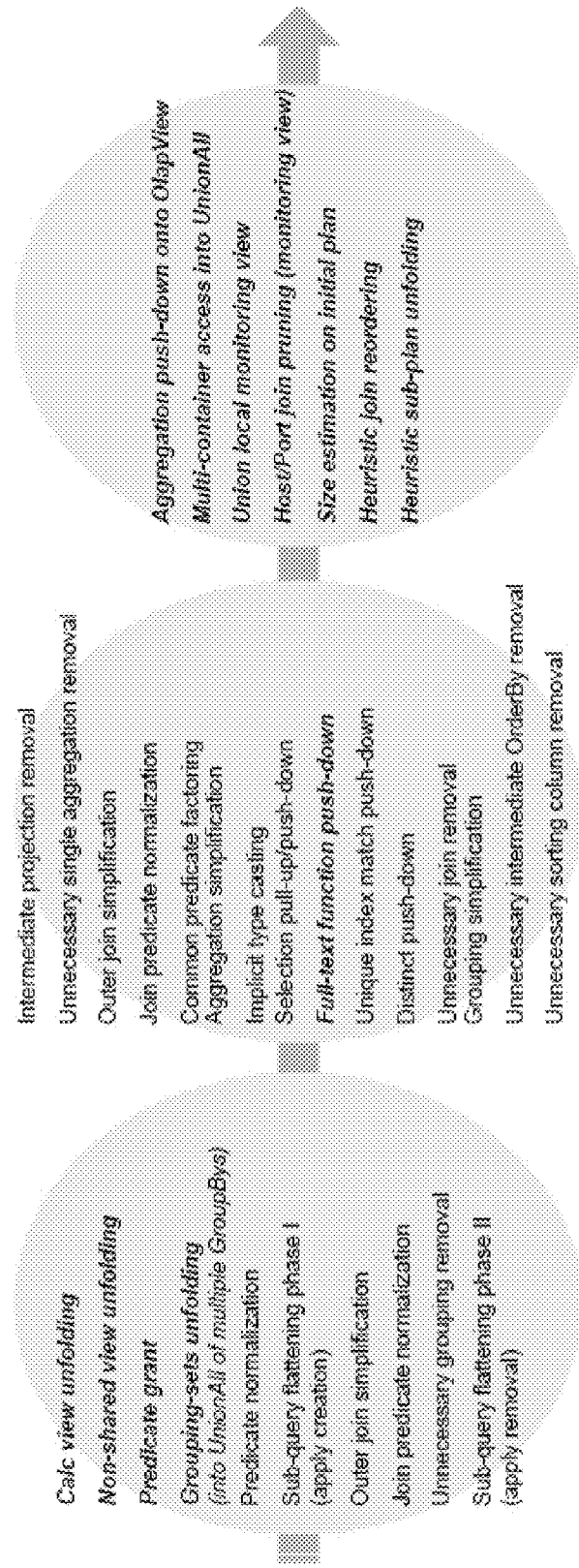
FIG. 1A is a graphical depiction of a variety of rules that may be used to re-write a query plan.

As shown in FIG. 1A, a large variety of different kinds of rules may possibly be employed in the query plan re-write process. FIG. 1A is not exhaustive, and additional query plan re-writing rules may be developed. Thus the rule catalog 108 of FIG. 1 may also facilitate introduction of new re-write rules developed subsequent to deployment of the framework.

It is noted that not only the rules themselves, but the order in which the rules are applied by the engine, can have a significant impact on the ultimate structure of re-written query plan. Thus as shown in FIG. 1, the framework provides for the application of rules from the catalog, in a particular sequence 118. FIG. 1A also uses arrows to roughly depict an order in which various re-write rules may be applied.

In FIG. 1, the sequence of application of the rules may be determined based upon input 119 from the user. Here, as a merely an example, a "SIMPLIFY_OUTER_JOIN" rule for re-writing a query plan, is specified to be applied by the engine prior to a "FILTER_PUSH_DOWN" rule.

The query plan re-write framework further comprises a PlanViz/Trace module 120. As discussed extensively below at least in conjunction with FIGS. 6-8, this module allows tracing of changes to a query plan graph for each application of a re-write rule. Such visualization of plan changes reduces the burden of problem analysis for re-written query plans (e.g., in furtherance of debugging or new development efforts).

Figure 1B:
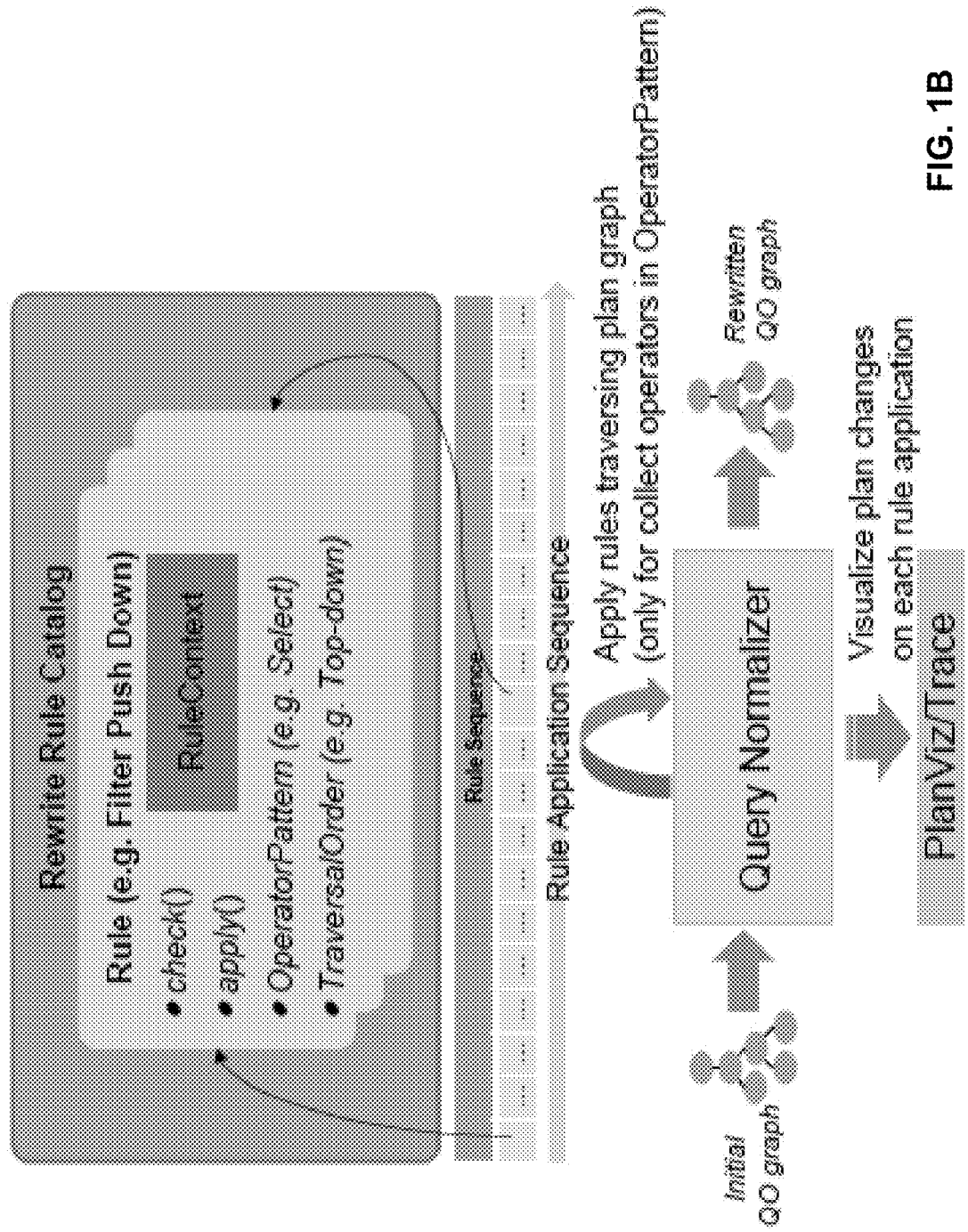
FIG. 1B shows details of the query plan re-write system of FIG. 1.

FIG. 1B shows details regarding the query plan re-write system of FIG. 1. In particular, for a given QO graph that is input to the framework, a set of re-write rules are applied in an order of precedence.

As mentioned previously, user can explicitly enable/disable certain rules. A user can also change a precedence in which rules are applied.

The query re-write rules may exhibit certain properties. As shown in FIG. 1B, a rule may employ a check( )function and an apply( )function.

Another property of a rule may be an operator pattern. Examples of such operator patterns include select, join, etc.

Yet another property of a rule may be a traversal order. This property may specify an order (e.g. top-down, or bottom-up), in which rules are applied.

Query plan re-write rules also exist within a larger context. Specifically, some rules are dependent and should be applied before/after applying main rule. As an example only, a specific rule dependency may be that "Predicate Simplification" is applied after "Select Push-down". As another example, a rule dependency may be that "Unreferenced View Column Removal" should be applied before "View Normalization".

Figure 2:
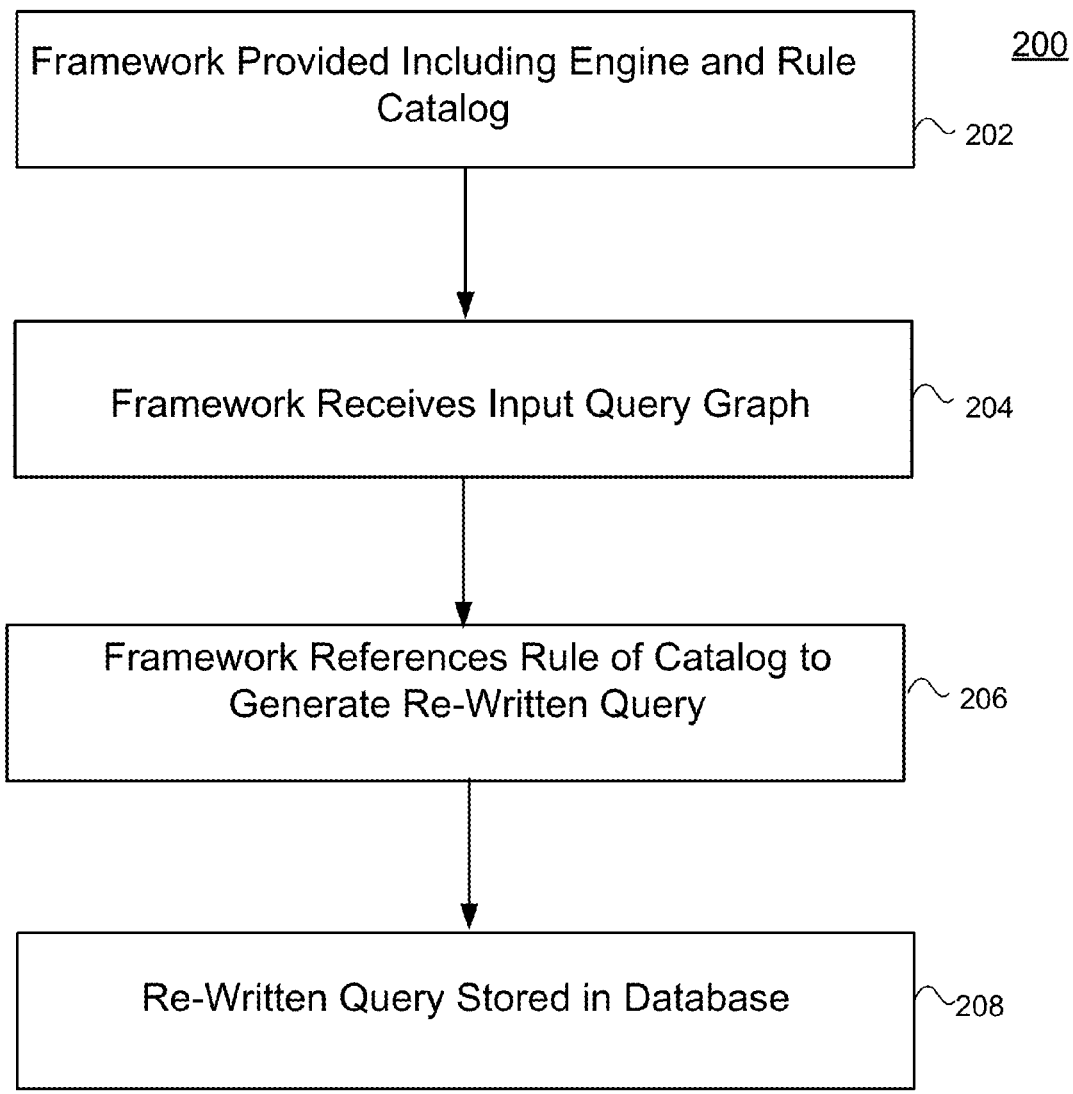
FIG. 2 is a simplified flow diagram of a process of re-writing a query according to an embodiment.

FIG. 2 is a simplified flow diagram of a process of re-writing a query plan according to an embodiment. In a first step 202 of the process flow 200, a query plan re-write framework is provided comprising an engine in communication with a rule catalog including a plurality of re-write rules.

In a second step 204 the engine receives a query plan graph as an input. In a third step 206 the engine references a first re-write rule of the rule catalog to create a re-written query plan graph.

In a fourth step 208, the engine causes the re-written query plan graph to be stored in a non-transitory computer readable storage medium, e.g. that containing the database to which the re-written query plan is being posed. This stored re-written query plan graph may later be accessed for various purposes, including but not limited to visualization for tracing query changes, in the manner discussed later below.

Re-writing of queries according to an embodiment, is now further described in connection with a particular example. Here, a query comprises a selection through join functionality. As described below, application of the query re-write rule "Filter Push Down", produces a re-written query plan that is substantially simplified in nature.

FIG. 3A is a simplified view of an embodiment of a rule catalog 300 according to the example. This rule catalog includes the "Filter Push Down" rule 302, including its properties and context.

It is noted that some rules can be applied multiple times. It is also noted that a user can override the rule if desired. Possible reasons for overriding a rule can include but are not limited to, debugging and process optimization.

The rule catalog thus affords a user with the ready ability to disable some rules (except for indispensable rules), thereby providing flexibility. The rule catalog also allows a user to apply particular rules multiple times, thereby conserving effort and expense.

Figure 3B:
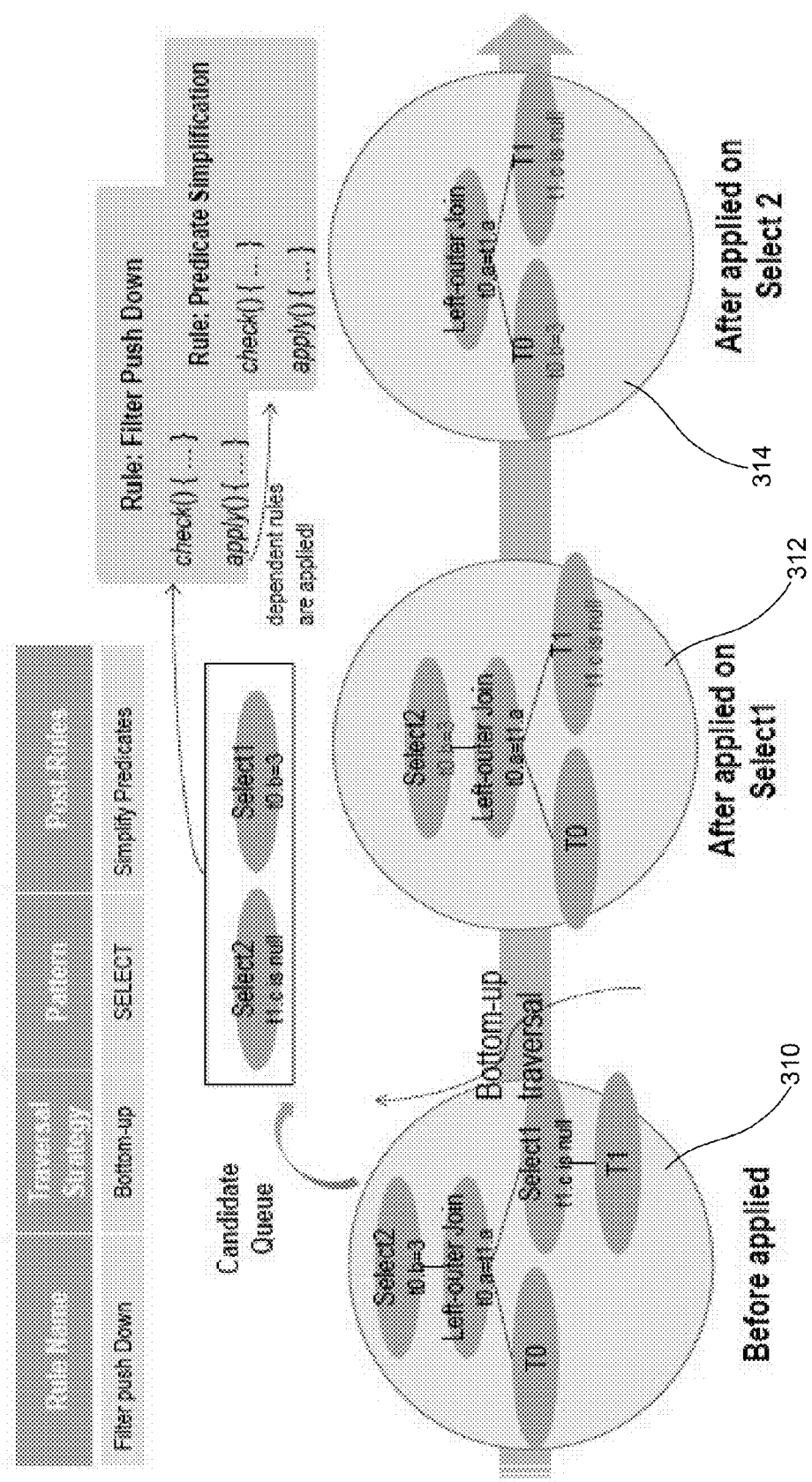
FIG. 3B is a simplified view of an embodiment of a query re-writing process according to an embodiment.

FIG. 3B is a simplified view illustrating re-writing of an original query plan according to this example, this original query plan 310 comprising Select1 and Select2 operations. In particular, a first application of the Filter Push Down rule (as well as the Predicate Simplification dependent rule implied by context) in a bottom-up manner to the original query plan 310, results in a first re-written query plan 312 eliminating the Select1 operation.

FIG. 3B also shows that subsequent application of re-write rules to the first re-written query plan 312, results in further simplification. In particular, the further re-written query plan 314 eliminates the Select2 operation.

Available query simplification rules may be monitored in various views available from a database. FIG. 4A shows the view "M_DEV_SQL_REWRITE_RULES", which displays available re-write rules.

FIG. 4B is a simplified version of the "M_DEV_SQL_REWRITE_RULE_CATALOG" view, which displays available re-write rules including a rule application sequence. FIGS. 5A-D show an example of a corresponding rule catalog.

As evident from the above description, the query plan re-write process may in fact comprise a number of different steps involving the application of various query plan re-write rules. In order to afford insight regarding the details of this complex query plan re-write process (e.g., for purposes of debugging, optimization, new development, etc.), the query plan re-write framework may be configured to provide a user with a visualization tracing the changes made to a query plan. Specifically, embodiments of the framework may provide stepwise query plan visualization for each rule application.

Figure 6:
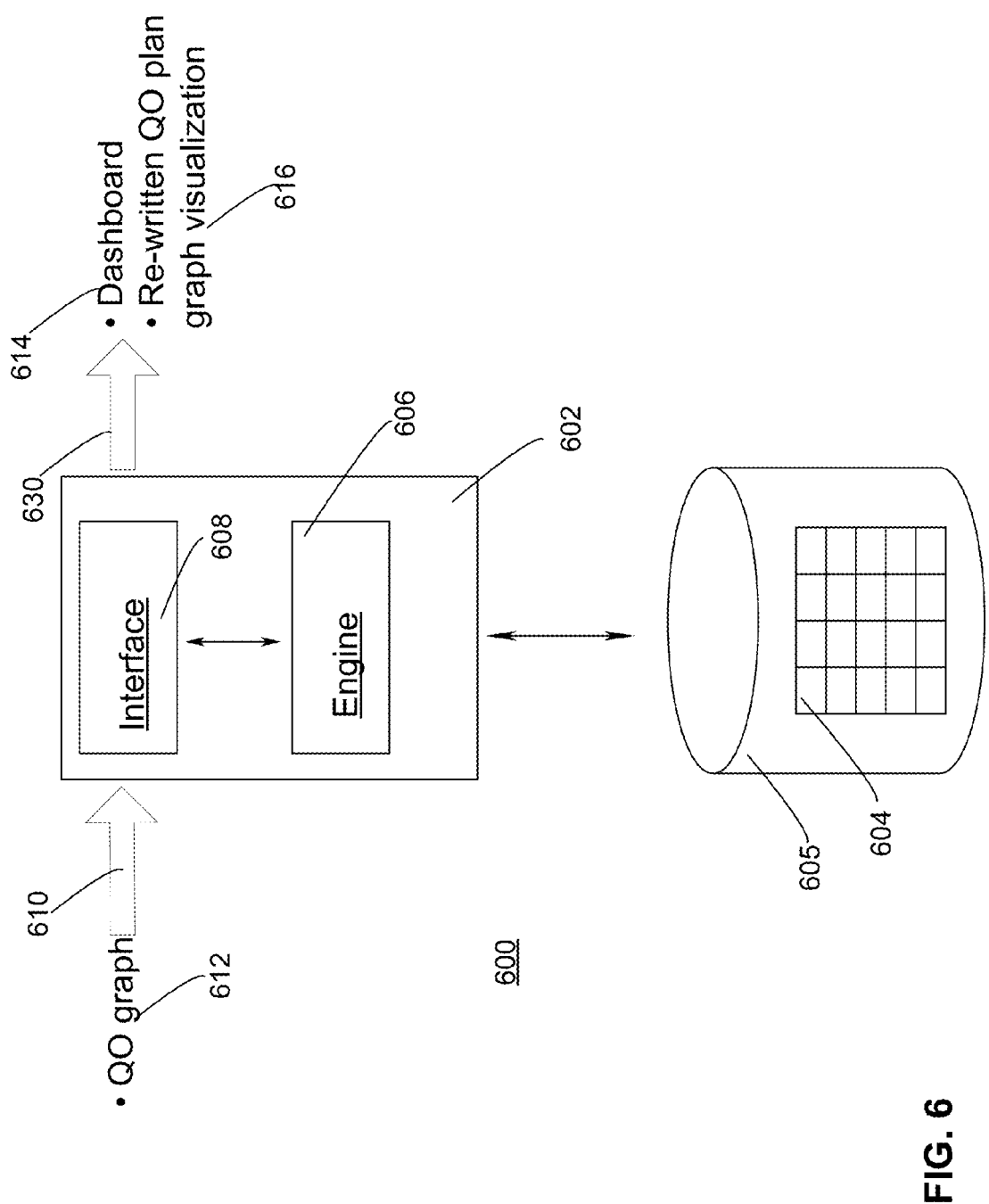
FIG. 6 shows a detailed view of a system configured for visualization of re-written query plans according to an embodiment.

Accordingly, FIG. 6 shows a detailed view of a system that is configured for visualization of re-written query plans according to an embodiment. System 600 comprises query plan re-write framework 602 that is in communication with a computer-readable storage medium 605 including a database 604.

Framework 602 comprises an engine 606 that is in communication an interface component 608. The interface component allows visualization of query optimization plans, and tracing of changes made to same by a re-write process.

In particular, the framework 602 is configured to receive input 610 via the interface, in the form of a QO graph 612 that is to be re-written. The engine performs the re-write process, and communicates a re-written query plan to the interface. The interface produces as output 630, a dashboard 614 with includes a visualization 616 of the re-written query graph.

Figure 6A:
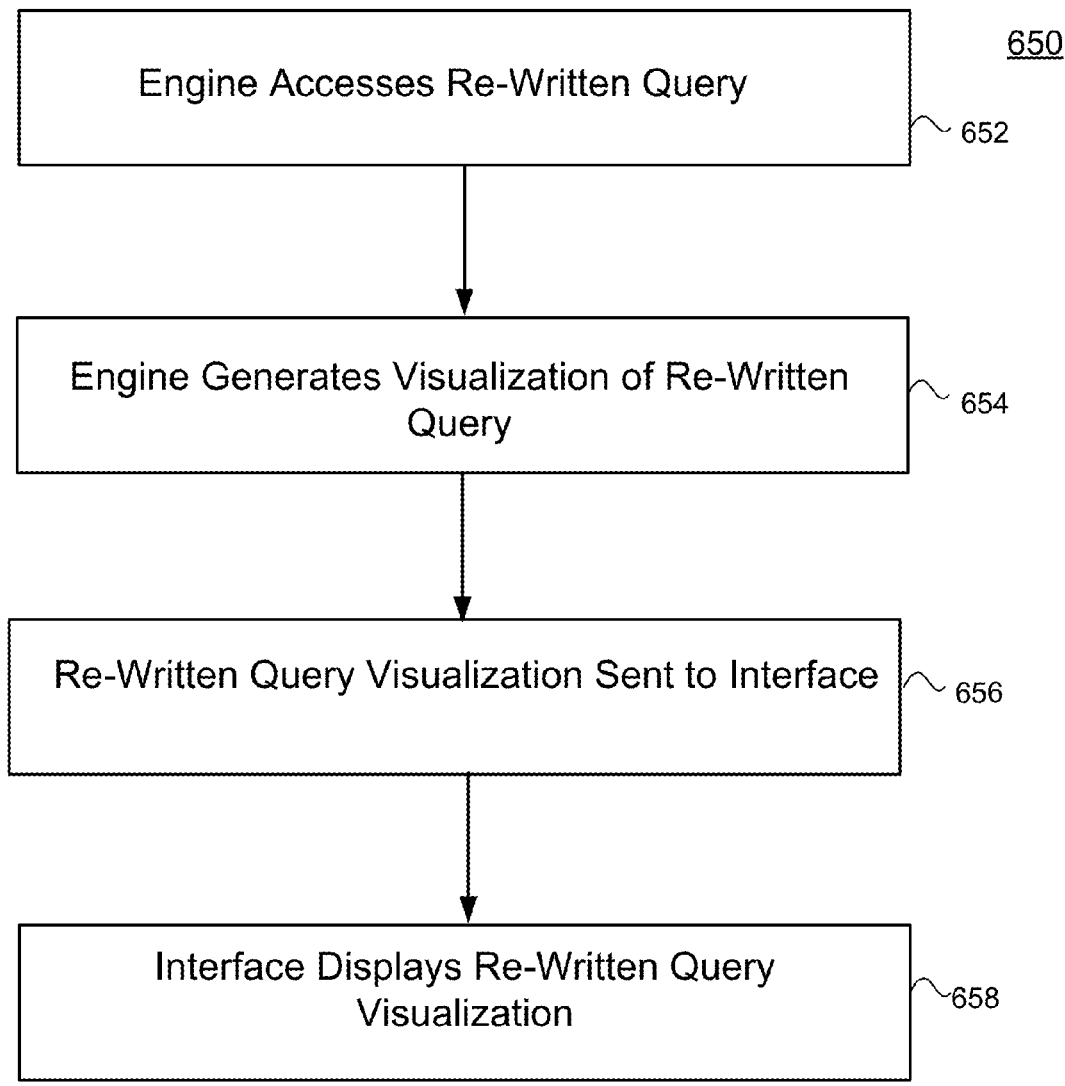
FIG. 6A is a simplified flow diagram illustrating a process of visualizing a re-written query plan according to an embodiment.

FIG. 6A is a simplified flow diagram illustrating a process of visualizing a re-written query plan according to an embodiment. In a first step 652 of process 650, an engine of a query plan re-write framework accesses a re-written query plan graph.

In a second step 654, the engine generates a visualization of the stored re-written query plan. In a third step 656, the engine communicates the stored re-written query plan to an interface.

In a fourth step 658, the interface displays a visualization of the re-written query plan graph in a dashboard. As described below, this query plan re-write visualization may include visual elements such as graphs, colors, animations, and/or shading.

Figure 7:
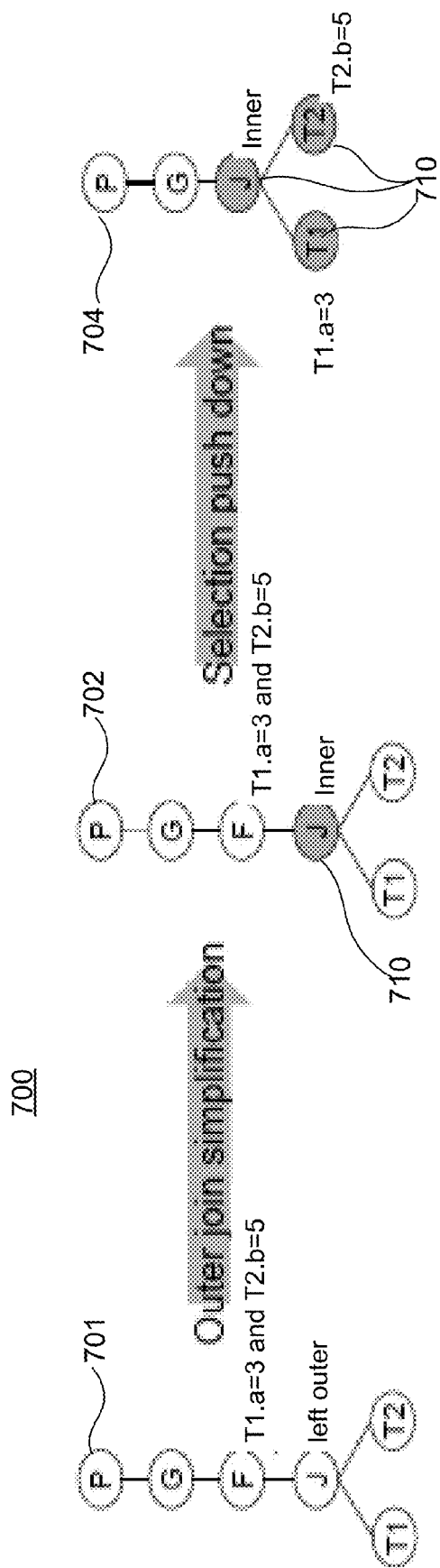
FIG. 7 shows a simplified view of visualization of a re-written query plan according to an example.

Visualization of a re-written query plan according to an embodiment, is now further illustrated in connection with a specific example. In particular, FIG. 7 shows a simplified view of a visualization 700 of an original query plan 701. This query plan is expressed as a tree of nodes, with certain nodes representing operations (e.g., P=project; G=group by; F=filter, J=join), and other nodes representing tables (Tn=table n).

In this example, the original query plan 701 is first re-written as query plan 702 in order to achieve outer join simplification. The query 702 is then further re-written as query plan 704 to achieve selection push down.

The query re-write visualization of FIG. 7 displays step-by-step (rule-by-rule) plan changes, utilizing highlighting 710. This provides multiple plan snapshots for each effective rule that makes changes in the query optimization plan.

Particular embodiments may offer enhanced visualization of re-written query plans beyond the relatively simple embodiment of FIG. 7. Additional information furnished by a visualization may include not only the re-written query plan itself, but also the rule whose application resulted in rewriting of the query plan in the manner visualized. Such information presented in a visualization, can identify the rule by name and provide other details such as rule application sequence number.

Figure 7A:
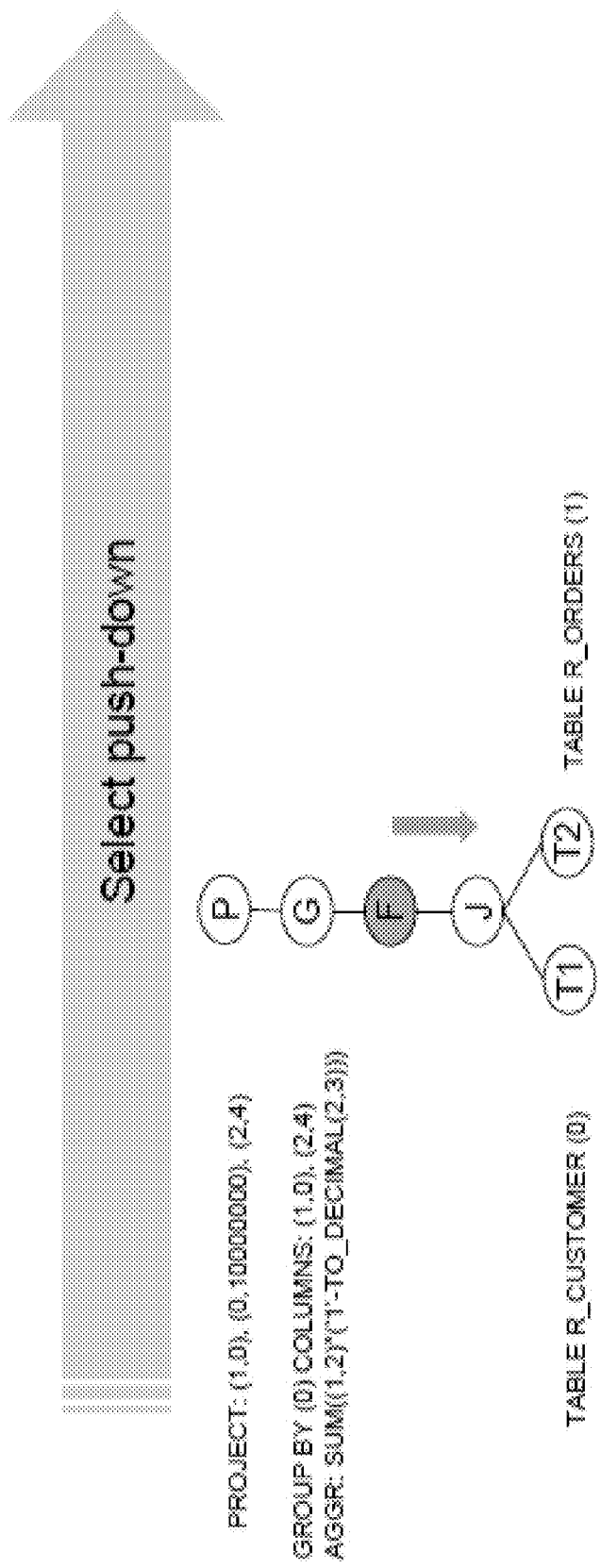
Figure 7C:
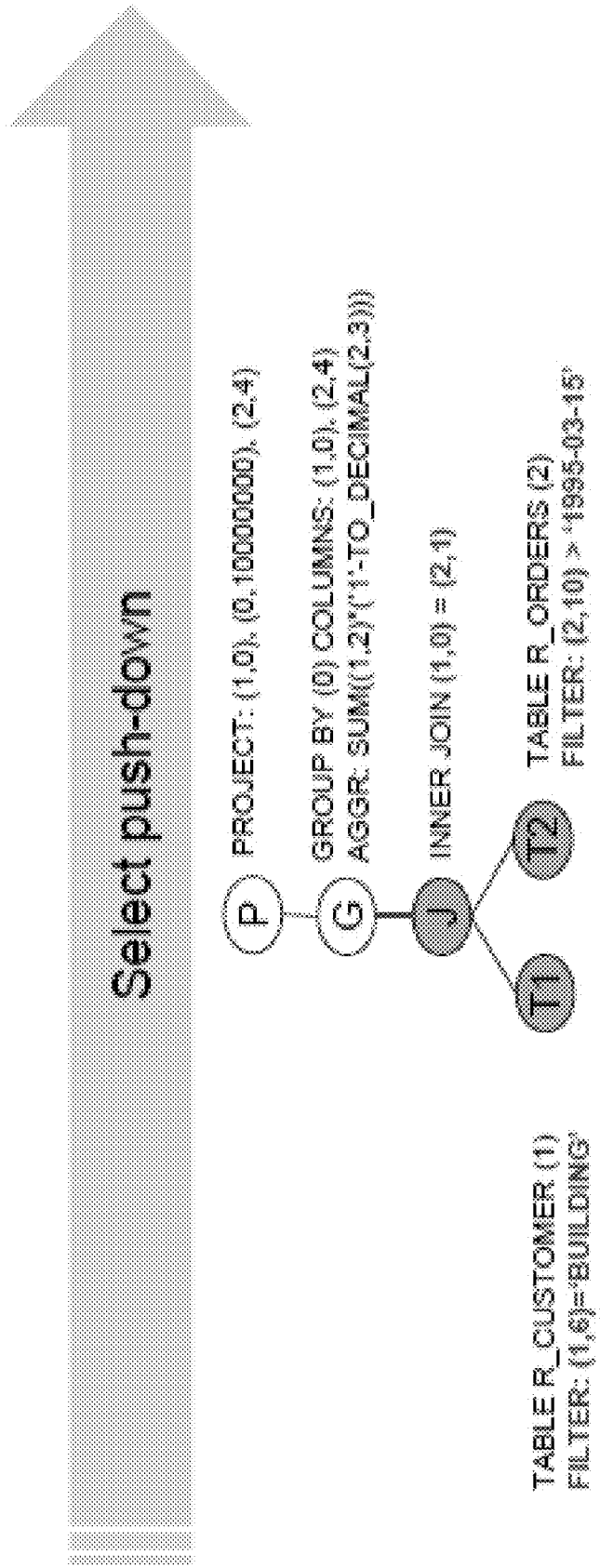

FIGS. 7A-D provide additional details regarding the query plan re-write visualization in this example. In particular FIGS. 7A and 7C show visualization of the query plan re-write of FIG. 7, with additional details provided by associated text.

The corresponding FIGS. 7B and 7D show that changes to a query optimization plan obtained by re-writing, may be tracked in the form of a log. Here, the Keep change log is in the optimizer context. The log format comprises:
<operation type><node-id><rule-id>, where
Operation type: C/LU/CU/D (C: create, LU: link-update, CU: contents-update D: delete)

FIG. 8 shows a simplified view of a dashboard for query plan visualization offered by a user interface according to an embodiment. In particular, the dashboard 800 comprises views for graphs 802, for rules 804, for properties 806, and for stepwise changes 808.

In the graphs view, the graph on the left-hand side represents the plan before applying the rule. The graph on the right-hand side represents a resulting plan of the rule application.

The outlined node in the right-hand graph indicates operator(s) that have been changed over rule application. This changed information can be afforded in a variety of ways, including through the use of various colors (e.g., text font color, node background color/highlighting, node outline color, etc.)

In the rules view, a table may show a list of rules applied for this particular query. Selecting a rule allows a user to see a list of changed operators in the table.

The properties view allows viewing of node properties. For each node selected, extra properties may be made visible. This view may afford one or more details including but not limited to the operator applied at the node, cost information, and/or tables involved.

The stepwise change view displays the properties that have changed due to application of a re-write rule for the selected node.

This dashboard provided by the user interface allows for disabling or enabling of certain rules. By selecting a 'Rewrite Rules' tab in an SQL Editor, a list of rules can be viewed. By right-clicking on any one of those rules, it can be disabled or enabled.

Figure 9:
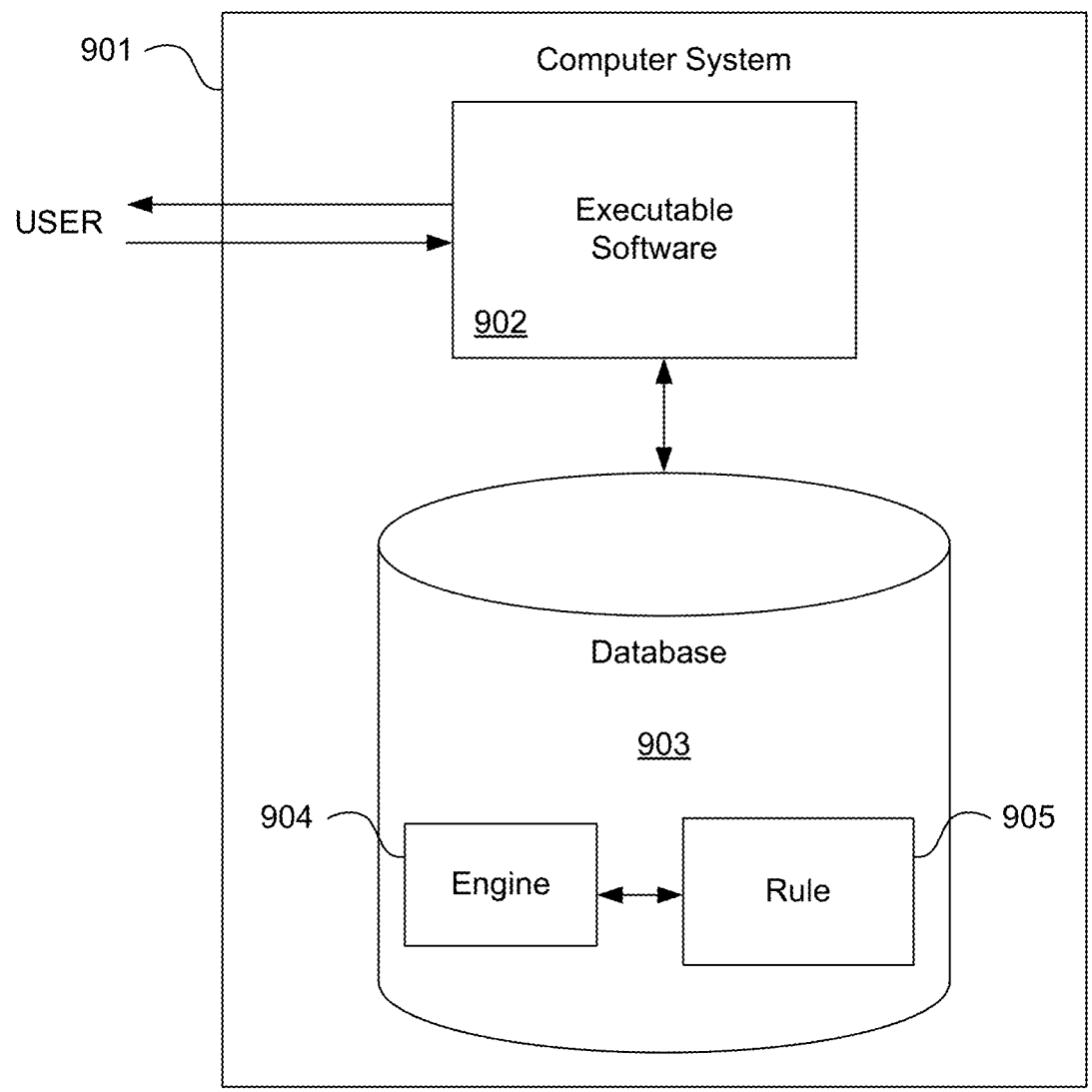
FIG. 9 illustrates hardware of a special purpose computing machine configured to implement query plan re-writing and visualization according to an embodiment.

FIG. 9 illustrates hardware of a special purpose computing machine configured to perform query plan re-writing and visualization according to an embodiment. In particular, computer system 901 comprises a processor 902 that is in electronic communication with a non-transitory computer-readable storage medium 903. This computer-readable storage medium has stored thereon code 905 corresponding to a rule (e.g. as may be included in a rule catalog). Code 904 corresponds to a query normalizer engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 10:
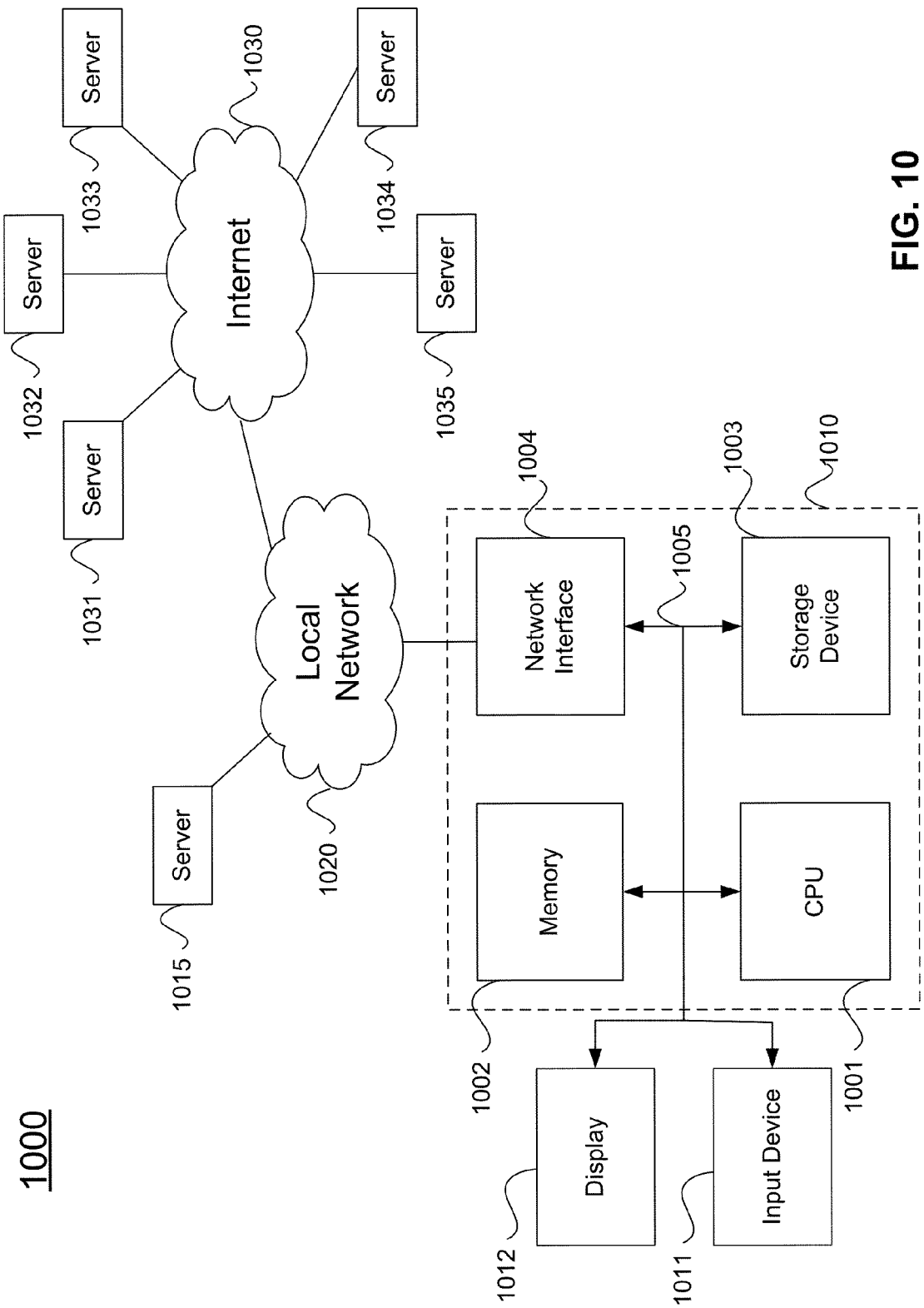
FIG. 10 illustrates an example of a computer system.

An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, and implementations may be employed.

What is claimed is:

1. A computer-implemented method comprising:
providing an engine in communication with a re-written query plan and with an interface, the re-written query plan resulting from application of a query plan re-write rule to a previous query plan;
causing an engine to reference the re-written query plan in order to generate a visualization comprising a graph including an operation node and a table node; and
causing the engine to communicate the visualization to the interface for display in a dashboard, wherein the dashboard further includes a change log separate from the graph and reflecting changes to the re-written query plan in a format comprising an identifier of the operation node, an operation type, an updated parent node identifier, and an identifier of the query plan re-write rule.

2. A method as in claim 1 wherein the visualization includes a color indicating a change of the re-written query plan from the previous query plan.

3. A method as in claim 1 wherein the dashboard further includes the previous query plan.

4. A method as in claim 1 wherein the dashboard further includes a part of the query plan re-write rule.

5. A method as in claim 4 further comprising causing the engine to change the query plan re-write rule based upon input received from the interface.

6. A method as in claim 1 wherein the dashboard further includes cost information.

7. A non-transitory computer readable storage medium embodying a computer program for performing a method, said method comprising:
provide an engine in communication with a re-written query plan and with an interface, the re-written query plan resulting from application of a query plan re-write rule to a previous query plan;
causing an engine to reference the re-written query plan in order to generate a visualization comprising a graph including an operation node and a table node; and
causing the engine to communicate the visualization to the interface for display in a dashboard, wherein the dashboard further includes a change log separate from the graph and reflecting changes to the re-written query plan in a format comprising an identifier of the operation node, an operation type, an updated parent node identifier, and an identifier of the query plan re-write rule.

8. A non-transitory computer readable storage medium as in claim 7 wherein the visualization includes a color indicating a change of the re-written query plan from the previous query plan.

9. A non-transitory computer readable storage medium as in claim 7 wherein the dashboard further includes the previous query plan.

10. A non-transitory computer readable storage medium as in claim 7 wherein the dashboard further includes a part of the query plan re-write rule.

11. A non-transitory computer readable storage medium as in claim 10 wherein the method further comprises causing the engine to change the query plan re-write rule based upon input received from the interface.

12. A non-transitory computer readable storage medium as in claim 7 wherein the dashboard further includes cost information.

13. A computer system comprising:
one or more processors;
a software program, executable on said computer system, the software program configured to:
provide an engine in communication with a re-written query plan and with an interface, the re-written query plan resulting from application of a query plan re-write rule to a previous query plan;
cause an engine to reference the re-written query plan in order to generate a visualization comprising a graph including an operation node and a table node; and
cause the engine to communicate the visualization to the interface for display in a dashboard further comprising the previous query plan, wherein the dashboard further includes a change log separate from the graph and reflecting changes to the re-written query plan in a format comprising an identifier of the operation node, an operation type, an updated parent node identifier, and an identifier of the query plan re-write rule.

14. A computer system as in claim 13 wherein the visualization includes a color indicating a change of the re-written query plan from the previous query plan.

15. A computer system as in claim 13 wherein the dashboard further includes a part of the query plan re-write rule.

16. A computer system as in claim 13 wherein the dashboard further includes cost information.

\* \* \* \* \*